Patented Feb. 15, 1938

2,108,618

UNITED STATES PATENT OFFICE 2,108,618

HARD ALLOY

Kaare S. Seljesaeter, Bergen, Norway, assignor to Western Electric Company, Incorporated, New York, N. Y., a corporation of New York No Drawing. Application November 10, 1934, Serial No. 752,469

6 Claims. (Cl. 75—136)

This invention relates to hard alloys and more particularly to sintered nitride alloys.

Objects of the invention are to provide hard sintered nitride alloys and effective and efficient methods of making such alloys.

In accordance with one embodiment of the invention, tantalum nitride or tantalum nitrocarbide with or without a suitable bonding agent is sintered under pressure to produce a hard alloy adapted to be used in cutting or grinding tools, dies, and the like.

Other objects and advantages will appear as the description proceeds.

Alloys of the type to which this invention relates include primarily tantalum nitride and tantalum nitrocarbide in which the nitrogen is combined with the tantalum to form tantalum nitride and carbon is combined with tantalum to form tantalum carbide. These compounds may be sintered under pressure with or without a bonding agent of the iron group, preferably cobalt or nickel.

Tantalum nitride may be formed by heating tantalum oxide and carbon in a nitrogen atmosphere. In order to obtain the tantalum nitride in powdered form suitable for sintering, the tantalum oxide is crushed and powdered prior to the reduction of the oxide. An alternative method of obtaining the powdered tantalum nitride is to heat thin metal strips or sheets of tantalum to a red heat in a hydrogen atmosphere to produce a brittle hydride which may be readily crushed to a fine powder. This powder is then nitrided at a temperature of about 1000° C. in a stream of nitrogen from which the oxygen has been carefully removed. The resulting nitride contains from 6% to 7% nitrogen.

Where a substantially pure sintered tantalum nitride is desired, the powder may be placed in a graphite mold lined with sheet tantalum. A pressure of 1000 to 1500 pounds per square inch or higher is then applied to the powder in the mold and the powder is heated under pressure in a furnace, such as a high frequency induction furnace. The energy input into the furnace is maintained at a value to cause sintering and may in some cases be applied for 45 minutes, after which the energy input is reduced to approximately one-half its original value for a period of 30 minutes. After cooling, the outside tantalum sheet comprising the mold lining which adheres to the sintered body may be removed by grinding.

A similar procedure may be followed when a bonding agent, such as a metal of the iron group, is used. Thus from zero to 15 per cent of metallic cobalt powder may be incorporated in the tantalum nitride powder prior to the pressing and sintering operation. The sintered alloy produced by the inclusion of a bonding agent is tougher and, therefore, more suitable for some purposes than a sintered alloy without a bonding agent.

Sintered tantalum nitrocarbide alloys may be produced in two ways. The tantalum nitride may be mixed with tantalum carbide and sintered, or carbon may be mixed with tantalum nitride and at the sintering temperature the carbon will react with the nitride to form tantalum carbide. The carbon content of the sintered alloy may range from zero to 6% or more. An excellent hard alloy may be made of tantalum nitride containing 1.3% carbon and 5% cobalt. The cobalt content may, however, be varied as well as the carbon content and may range from zero to 15%. In sintering alloys of this type containing carbon under pressure in a graphite mold, it is not necessary to line the mold with sheet tantalum as in the case where a carbon-free alloy is desired.

Photomicrographs of sintered tantalum nitrocarbide alloys containing a bonding metal show that these alloys have an extremely low porosity and their density measures from 13 to 14 grams per cubic centimeter. These alloys also possess a high degree of hardness and are sufficiently non-brittle to permit them to be ground to the desired shape for tool elements, dies and the like.

It will be understood that the embodiments of the invention herein disclosed are merely illustrative and that many changes and modifications may be made therein without departing from the spirit and scope of the invention.

What is claimed is:

1. A hard alloy containing from 99% to 85% of a sintered mixture of tantalum nitride and tantalum carbide and 1% to 15% cobalt.

2. A sintered alloy containing 93.7% tantalum nitride, 1.3 per cent carbon, and 5 per cent cobalt.

3. A hard alloy containing from 99% to 85% of a sintered mixture of tantalum nitride and tantalum carbide, and 1% to 15% bonding agent.

4. A hard alloy containing 95% of a sintered mixture of tantalum nitride and tantalum carbide, and 5% bonding agent selected from the group of iron, nickel and cobalt.

5. A hard sintered alloy comprising substantial amounts of to 6 per cent carbon, substantial amounts of to 15 per cent cobalt, and the remainder substantially tantalum nitride.

6. A hard sintered alloy comprising substantial amounts of to 6 per cent carbon, substantial amounts of to 15 per cent bonding agent of the iron group, and the remainder substantially tantalum nitride.

KAARE S. SELJESAETER.